(12) United States Patent
Al-Qaneei

(10) Patent No.: US 9,318,021 B2
(45) Date of Patent: Apr. 19, 2016

(54) VEHICLE MOUNTED TRAFFIC LIGHT AND SYSTEM

(71) Applicant: Jassem M. Al-Jasem Al-Qaneei, Salam (KW)

(72) Inventor: Jassem M. Al-Jasem Al-Qaneei, Salam (KW)

( * ) Notice: Subject to any disclaimer, the term of this patent is extended or adjusted under 35 U.S.C. 154(b) by 0 days.

(21) Appl. No.: 14/316,748

(22) Filed: Jun. 26, 2014

(65) Prior Publication Data

US 2015/0379872 A1    Dec. 31, 2015

(51) Int. Cl.
*G08G 1/09*      (2006.01)
*G08G 1/0967*    (2006.01)

(52) U.S. Cl.
CPC ............................. *G08G 1/096783* (2013.01)

(58) Field of Classification Search
CPC . G08G 1/0962; G08G 1/0116; G08G 1/0141; G08G 1/095; B60W 50/14
USPC ........................................................ 340/464
See application file for complete search history.

(56) References Cited

U.S. PATENT DOCUMENTS

| | | | |
|---|---|---|---|
| 2,128,067 A | 8/1938 | Alimaras | |
| 4,903,008 A * | 2/1990 | Lewis | 362/548 |
| 5,635,920 A * | 6/1997 | Pogue et al. | 340/901 |
| 5,805,081 A * | 9/1998 | Fikacek | 340/908 |
| 5,870,967 A * | 2/1999 | Hecht | 116/28 R |
| 5,905,434 A * | 5/1999 | Steffan | B60Q 1/50 116/28 R |
| 6,124,647 A * | 9/2000 | Marcus | B60C 23/0401 307/10.1 |
| 6,374,766 B1 * | 4/2002 | Clark | 116/28 R |
| 6,870,473 B2 * | 3/2005 | Brown, Jr. | 340/463 |
| 6,965,321 B1 * | 11/2005 | Arab | 340/901 |
| 6,985,073 B1 * | 1/2006 | Doan | 340/425.5 |
| 7,398,076 B2 | 7/2008 | Kubota et al. | |
| 7,495,579 B2 | 2/2009 | Sirota et al. | |
| 7,548,172 B2 * | 6/2009 | Shinada et al. | 340/903 |
| 8,031,062 B2 | 10/2011 | Smith | |
| 8,040,252 B2 * | 10/2011 | Namikawa | 340/901 |
| 8,305,444 B2 * | 11/2012 | Hada | 348/148 |
| 8,395,522 B2 * | 3/2013 | Kweon | 340/670 |
| 8,504,270 B2 * | 8/2013 | Busch | 701/70 |
| 2002/0032510 A1 * | 3/2002 | Turnbull et al. | 701/49 |
| 2005/0200500 A1 * | 9/2005 | Wing | 340/907 |
| 2007/0027583 A1 * | 2/2007 | Tamir et al. | 701/1 |

(Continued)

FOREIGN PATENT DOCUMENTS

CN      101334934 A     12/2008
CN      201549076 U     8/2010

(Continued)

*Primary Examiner* — Firmin Backer
*Assistant Examiner* — Nay Tun
(74) *Attorney, Agent, or Firm* — Richard C. Litman

(57) ABSTRACT

The vehicle mounted traffic light adds a mini-signal light located inside a vehicle on the deck behind the back seat of the vehicle, to enable its signaling units, such as signal lights, to be visible to other vehicles, such as cars, behind the vehicle. A wireless signal from a wireless transmitter associated with an originating signal system unit associated with a traffic signal light transmits the signal light state of the traffic signal light to a receiver associated with the vehicle, such located as inside the vehicle. The receiver relays the received signal light state information to a processor associated with the vehicle mounted traffic light, such as located inside the vehicle, which issues commands to the signaling units of the vehicle mounted traffic light to mimic or correspond to the received signal light state of the traffic signal light.

14 Claims, 7 Drawing Sheets

(56) References Cited

U.S. PATENT DOCUMENTS

| | | | |
|---|---|---|---|
| 2007/0205581 A1* | 9/2007 | Wilcox | 280/477 |
| 2009/0115632 A1* | 5/2009 | Park | 340/905 |
| 2011/0115647 A1* | 5/2011 | Mukaiyama | 340/907 |
| 2012/0140075 A1* | 6/2012 | Cunningham | G08G 1/096 348/148 |
| 2013/0093890 A1* | 4/2013 | Cunningham | B60K 35/00 348/148 |

FOREIGN PATENT DOCUMENTS

| | | |
|---|---|---|
| CN | 203386368 U | 1/2014 |
| KR | 10-2010-0040552 | 4/2010 |

* cited by examiner

VEHICLE MOUNTED TRAFFIC LIGHT AND SYSTEM

BACKGROUND OF THE INVENTION

1. Field of the Invention

The present invention relates to traffic signaling, and particularly to a vehicle mounted traffic light indicator which is directed to provide traffic signal information to one or more of a vehicle in which it is mounted and to traffic behind the vehicle.

2. Description of the Related Art

The first signal light appeared with three colors, namely red, orange, and green, for the first time around 1914, emerging from Cleveland, Ohio, USA. From such appearance of the signal light, the signal light has since spread across the globe and has resulted in organized automatic traffic control, such as for a specific time programmed at traffic intersections. Such signal lights have been used throughout the world, such as on the ground, sea and air. In this regard, the signal lights have directed many vehicles and will likely continue to direct more vehicles in the future. Thus, signal lights have become a basic necessity for organizing traffic in modern streets, for example.

There are many different sizes and shapes of vehicles nowadays. As a result, owners of relatively small vehicles can face a problem of blocked vision of the signal light in today's ongoing congestion which can contribute to or can cause accidents, such as due to the uncertainty of whether the color of the signal light is red or green, for example.

Also problems related to signal lights and their visibility can occur as a result of bad weather, fog, dust, torrential rain, sunlight glare, and also lighting that can come from nearby cars, can all be factors which can block the ability to see the signal light. Moreover, problems can also exist related to signal light visibility and operability, such as can result from a lack of maintenance of burned-out lamps, inoperable signals due to a collision or an accident, and downed signal lights due to other reasons, such as storms, for example. Additionally, some owners or drivers of vehicles, such as seniors, can have difficulty seeing the signal lights clearly, such as at certain distances or resulting from certain conditions, for example.

Thus, a vehicle mounted traffic light addressing the aforementioned problems is desired.

SUMMARY OF THE INVENTION

The vehicle mounted traffic light adds a mini-signal light located inside a vehicle, such as on the deck behind the vehicle's back seat, to provide visibility of its signal lights to one or more of a driver of the vehicle, such as in a rear view mirror of the vehicle, or to other vehicles behind the vehicle having the vehicle mounted traffic light. A wireless signal from an originating signal system unit exterior to the vehicle transmits the state of the traffic signal from a corresponding exterior traffic signal light, such as from a street mounted traffic light, to a receiver inside the vehicle. The receiver relays the state information to a processor, such as inside the vehicle mounted traffic light, which, based on the received state information, issues state commands to the one or more signaling units of the vehicle mounted traffic light to mimic or correspond to the signal state of the traffic signal light received from the originating signal system unit.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
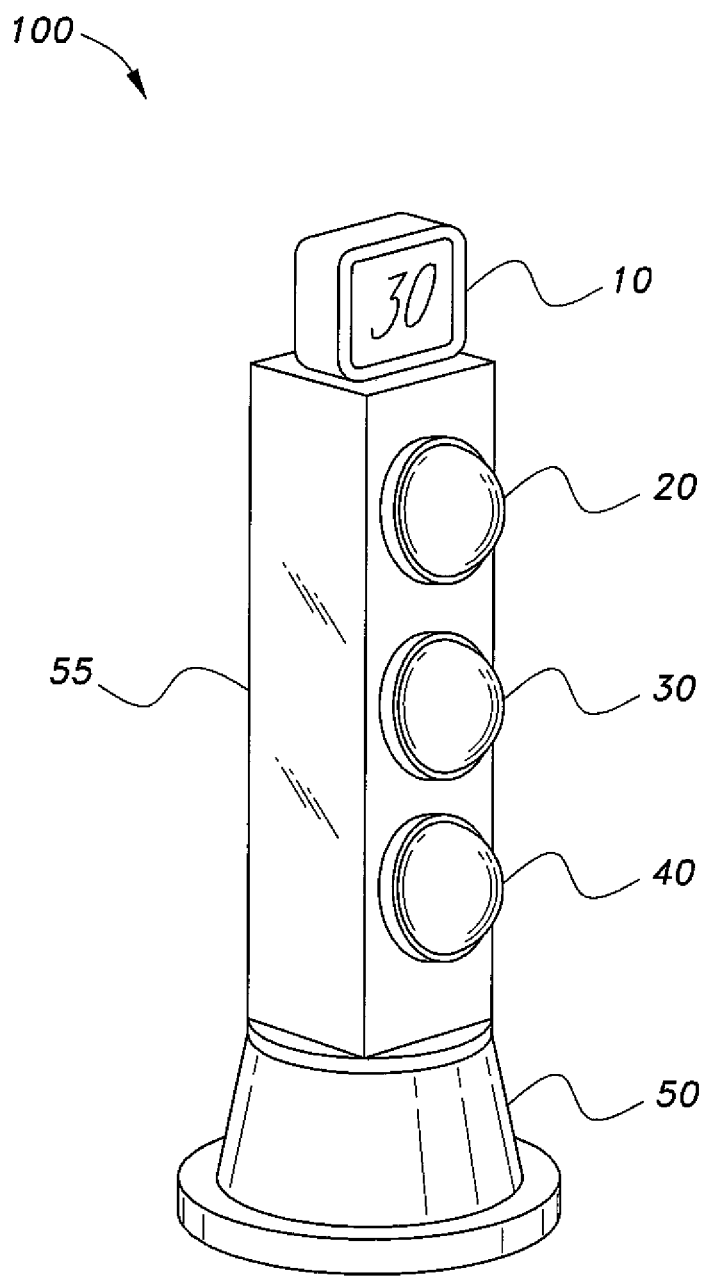
FIG. 1 is a perspective view of the vehicle mounted traffic light according to the present invention.

Referring to FIGS. 1-6, the vehicle mounted traffic light 100 (shown in FIG. 1) adds a mini-signal light located inside a vehicle V, such as on the deck behind the back seat of the vehicle V, as in a rear portion of an inside passenger compartment of the vehicle V, to provide that its signaling units, such as its signal lights or count-down timer, are visible to a driver of the vehicle V, such as in an image 100r in a rearview mirror M of the vehicle V, when the vehicle mounted traffic light is positioned to face inward relative to the vehicle V. The vehicle mounted traffic light 100 can also be positioned so that its signaling units are visible to cars or other vehicles behind the vehicle V, when the vehicle mounted traffic light is positioned to face outward relative to the vehicle V, for example.

A wireless signal from an originating signal system unit 200, located exterior to the vehicle V, transmits the signal light state of a traffic signal light 90, such as a street mounted traffic signal light, to a receiver associated with the vehicle mounted traffic light 100, such as located inside the vehicle V, as can be located in the vehicle mounted traffic light 100. The receiver relays this state information to a processor associated with the vehicle mounted traffic light 100, such as located inside the vehicle V, as can also be located in the vehicle mounted traffic light 100, which, based on the received state information, issues one or more state commands to the one or more signaling units, such as lights 20, 30 and 40 or to a count-down timer 10, of the vehicle mounted traffic light 100 to mimic or correspond to the signal light state of the traffic signal light 90. The signal light state of the traffic signal light 90 can correspond to that displayed by one or more of the states of the traffic signal light 90, such as a light 92 corresponding to an activated red light state, a light 94 corresponding to an activated yellow light state and a light 96 corresponding to an activated green light state, for example.

Figure 5:
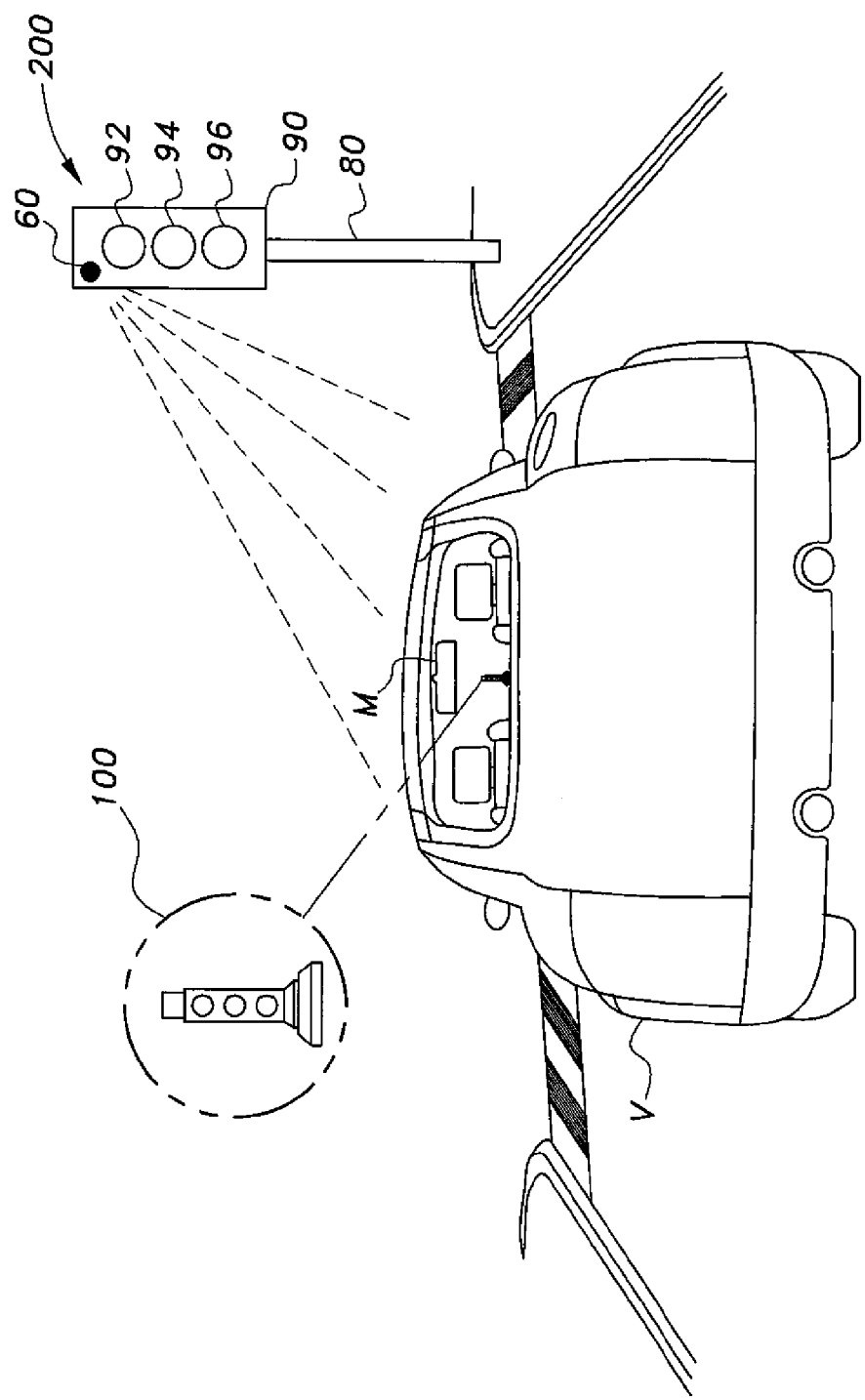
FIG. 5 is a rear perspective view of the vehicle including the vehicle mounted traffic light interacting with the originating signal system unit, with the signaling units, such as lights, of the vehicle mounted traffic light facing in an outward direction from the vehicle, according to the present invention.

As shown in FIG. 1, the vehicle mounted traffic light 100 includes one or more, desirably a plurality of signaling units, such as, for example, lights 20, 30 and 40 and the count-down timer 10. Typically, the lights 20, 30 and 40 will mimic or correspond to a light pattern of one or more activated signal light states, such as the signal light states 92, 94 and 96, of the traffic signal light 90, as shown in FIG. 5, such as a street mounted traffic signal light. In this regard, the light 20 will be a red light corresponding to the activated red signal light state 92, the light 30 will be a yellow light corresponding to the activated yellow signal light state 94 and the light 40 will be a green light corresponding to the activated green signal light state 96, for example. However, the traffic signal light 90 and the vehicle mounted traffic light 100 can include various signal lights and various numbers and types of signal lights, and the vehicle V can be various vehicles, such as various land, sea or air vehicles, and should not be construed in a limiting sense.

The count-down timer 10 of the vehicle mounted traffic light 100 indicates an expected or an estimated amount of time that a current signal light state of the traffic signal light 90 is to remain in effect, for example. The lights 20, 30 and 40 of the vehicle mounted traffic light 100 are typically mounted in a housing 55 that can be a substantially miniaturized version of a typical street mounted traffic signal light, but can be of other various shapes and configurations, and should not be construed in a limiting sense. The count-down timer 10 is typically mounted atop the housing 55 for the lights 20, 30 and 40 or is otherwise positioned in conjunction with the vehicle mounted traffic light 100, and should not be construed in a limiting sense. The housing 55 for the vehicle mounted traffic light 100 can sit atop a housing base 50 of the vehicle mounted traffic light 100, for example.

Figure 2:
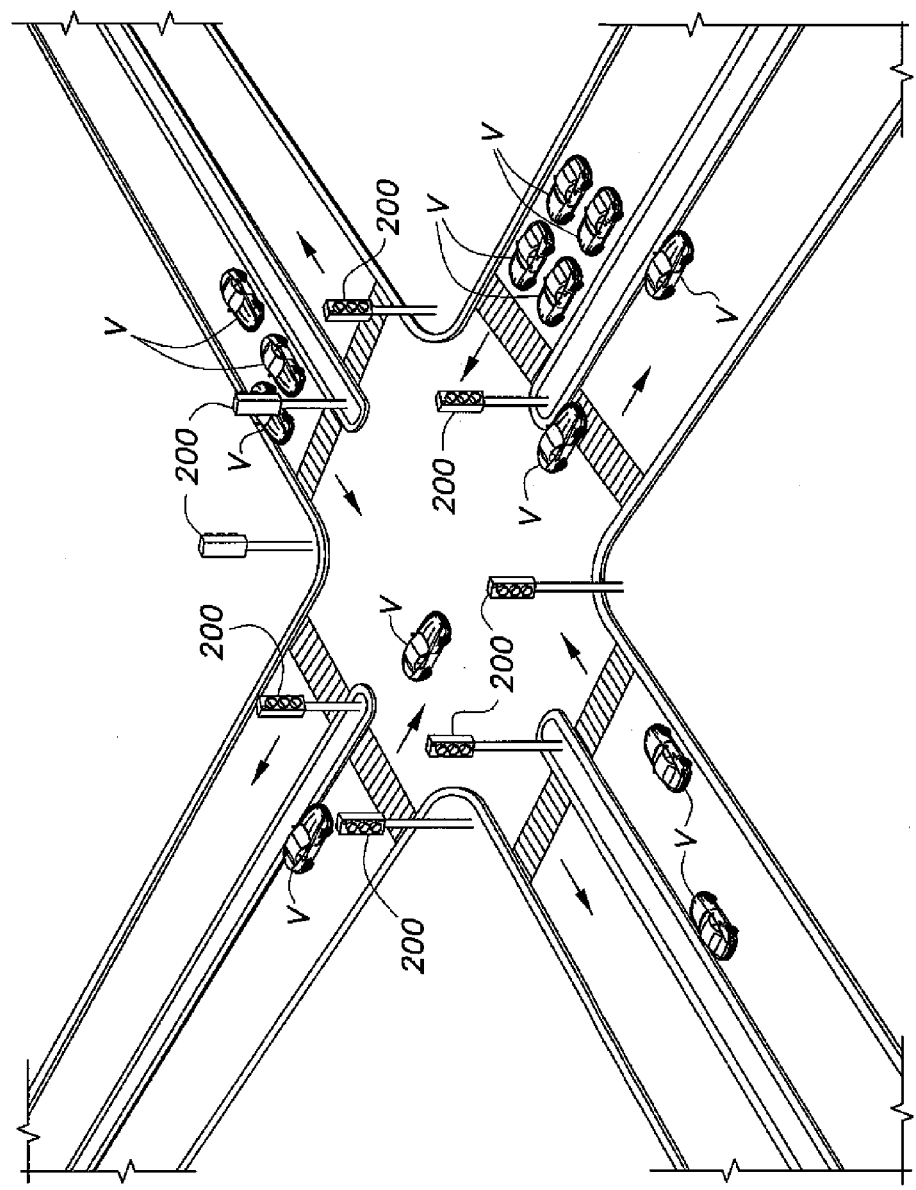
FIG. 2 is an environmental perspective view of vehicles using the vehicle mounted traffic light according to the present invention.
Figure 3:
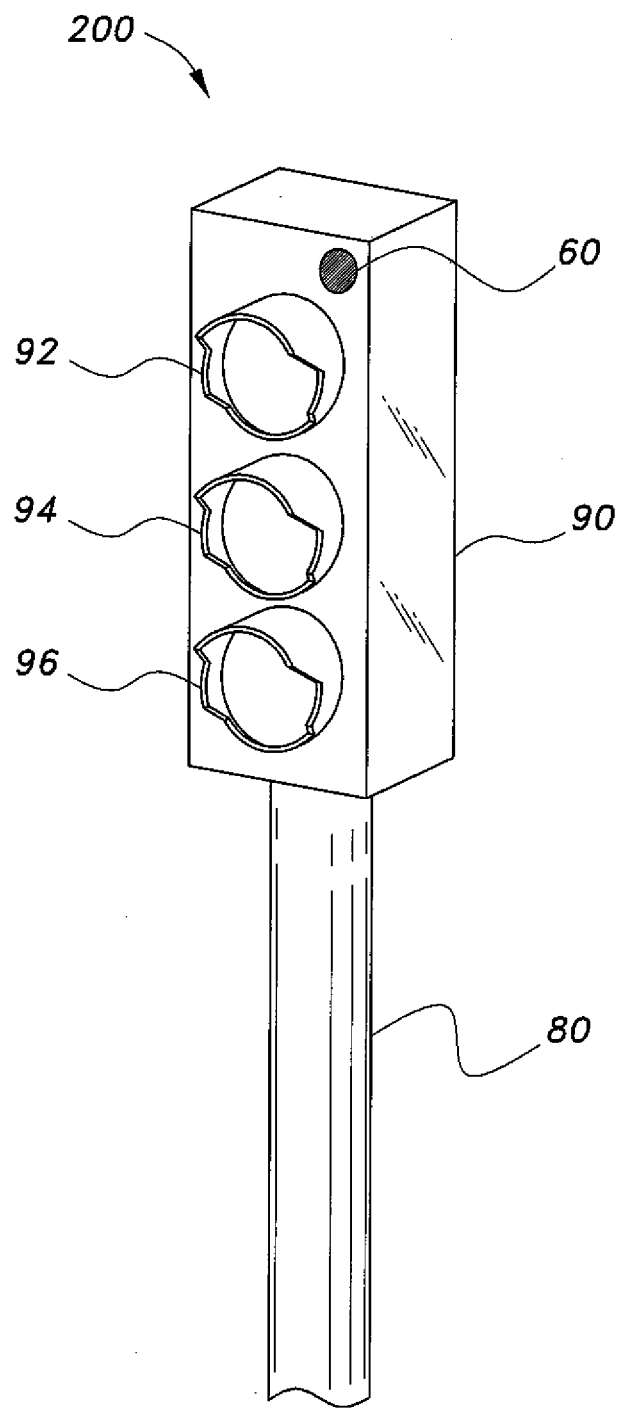
FIG. 3 is a perspective view of the exterior traffic signal light and transmitter of the originating signal system unit according to the present invention.

FIG. 2 shows a plurality of vehicles V at or approaching an intersection. One or more of the vehicles V include the vehicle mounted traffic light 100 which communicates wirelessly, receiving wireless signals from the originating signal system unit 200 which, as shown in FIG. 3, has been modified to include a wireless transmitter 60 to transmit state signals of one or more activated signal light states of the traffic signal light 90 aimed at or directed to the oncoming vehicular traffic including one or more vehicles V including the vehicle mounted traffic light 100, for example. The originating signal system unit 200 as can include or be positioned in conjunction with the traffic signal light 90 sits atop a traffic light pole 80, for example, but can be positioned in other suitable locations or on other suitable structures, and should not be construed in a limiting sense.

Figure 4:
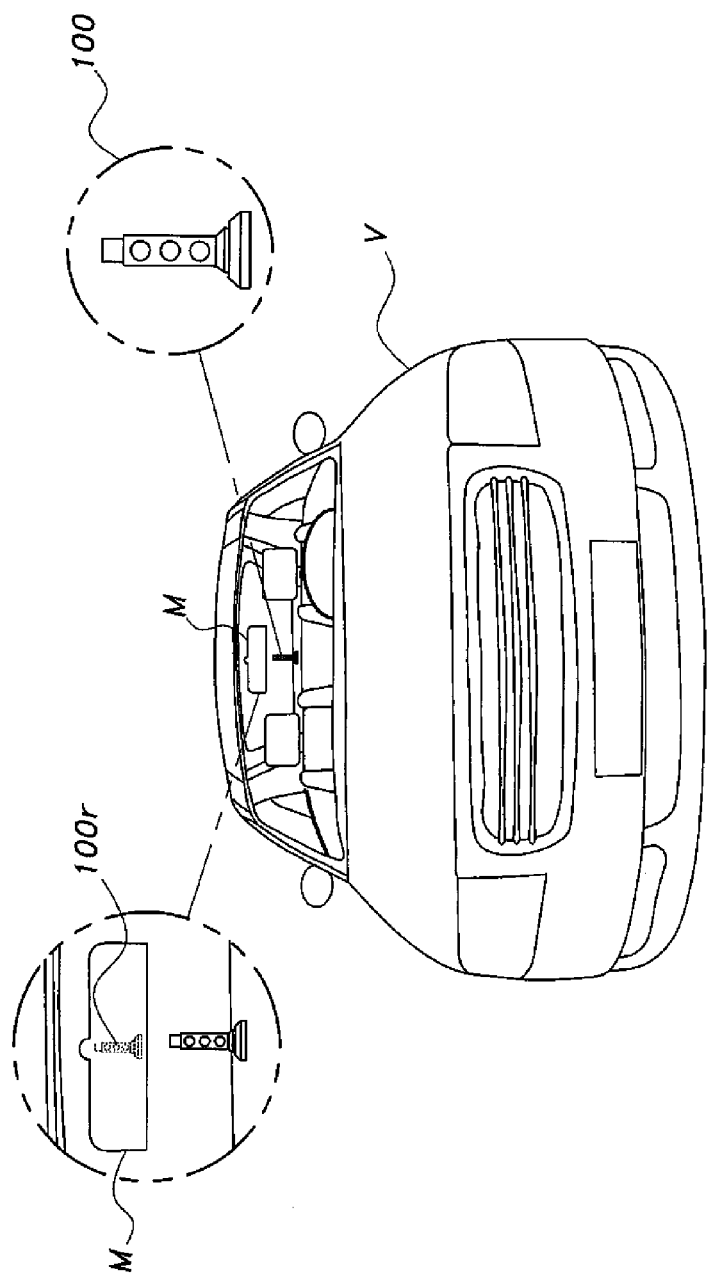
FIG. 4 is a front perspective view of the vehicle including the vehicle mounted traffic light, with the lights of the vehicle mounted traffic light facing in an inward direction, according to the present invention.
Figure 6:
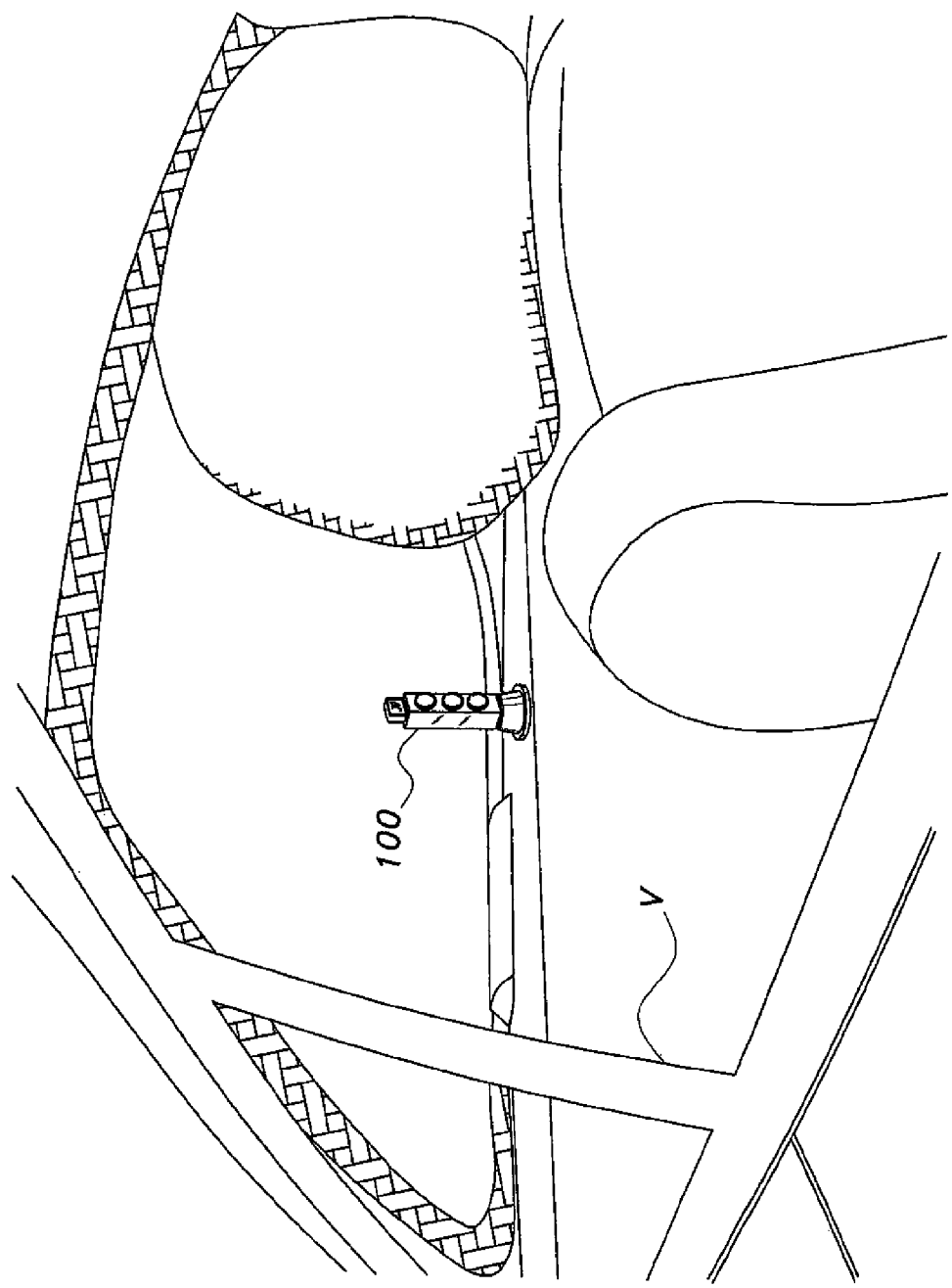
FIG. 6 is a side perspective view of the vehicle with the vehicle mounted traffic light according to the present invention.

Referring to FIG. 4, the vehicle mounted traffic light 100 is shown mounted in the inside rear of the vehicle V facing in a forward direction relative to the vehicle V as would appear from the front of the vehicle V. Also, FIG. 4 illustrates an image 100r of the vehicle mounted traffic light 100 as displayed in the rearview mirror M of the vehicle V, so as to be viewed by the driver of the vehicle V, for example. FIG. 5 illustrates the vehicle mounted traffic light 100 in a position to receive wireless transmissions of the signal light state of the traffic signal light 90 from the wireless transmitter 60 of the originating signal system unit 200. Also, FIG. 5 illustrates the vehicle mounted traffic light 100 as displayed facing in a rearward direction relative to the vehicle V, as can be displayed to other vehicles V, for example. Further, FIG. 6 is a side perspective view of the vehicle V showing the inside rear mounted vehicle mounted traffic light 100.

Figure 7:
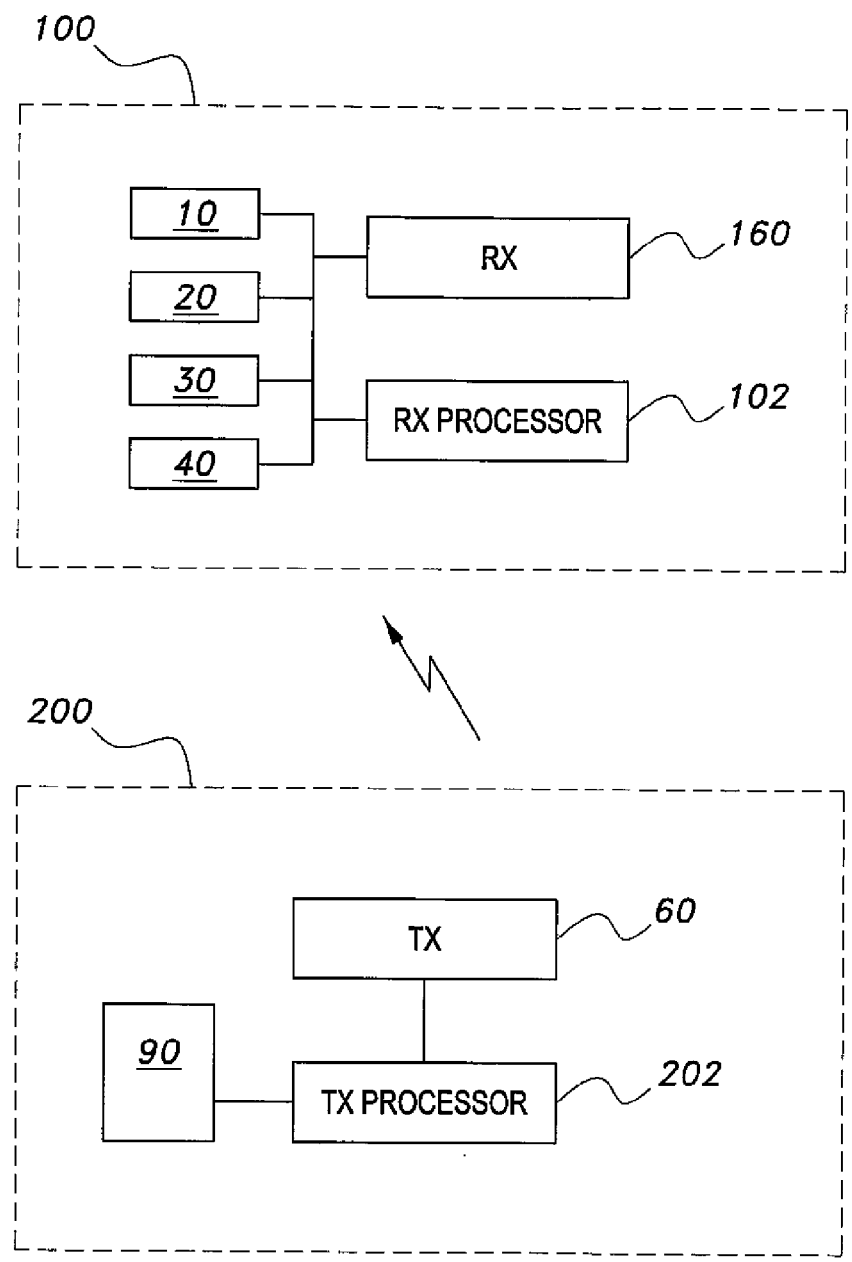
FIG. 7 is a block diagram of the vehicle mounted traffic light and the originating signal system unit according to the present invention.

Referring now to FIG. 7, as shown in FIG. 7, the operational system of the vehicle mounted traffic light 100 includes the count-down timer 10, the lights 20, 30 and 40 and a receiver (RX) 160 and a RX processor 102 that includes associated memory to store instructions to implement operation of the vehicle mounted traffic light 100. The originating signal system unit 200 includes a transmitter (TX) processor 202 that includes associated memory to store instructions to implement operation of the originating signal system unit 200 and is connected to or in communication with the wireless transmitter (TX) 60. The originating signal system unit 200 can also include or be in conjunction with the traffic signal light 90, the traffic signal light 90 being in communication with the (TX) processor 202, for example.

The originating signal system unit 200 including the TX processor 202 and the wireless transmitter TX 60 can be mounted on or near the traffic signal light 90, such as illustrated in FIGS. 3 and 5, for example. The TX processor 202 determines the signal light state of the traffic signal light 90, which can be an ON/OFF state, or an activated/inactivated state, of a corresponding signal light state of the lights 92, 94 and 96 of traffic signal light 90, as can correspond to the light 92 corresponding to an activated red light state, the light 94 corresponding to an activated yellow light state and the light 96 corresponding to an activated green light state, for example. The activated at least one signal light state is then relayed by TX processor 202 to the TX 60 for transmission to the vehicle mounted traffic light 100 included in the one or more vehicles V in the oncoming vehicle traffic, such as within a preselected distance or area in relation to traffic light signal 90.

The RX 160 is mounted in or on the vehicle V, and as shown in FIG. 7, the mount of RX 160 is typically inside the vehicle mounted traffic light 100 and the RX 160 communicates with the RX processor 102, also typically mounted inside the vehicle mounted traffic light 100, which obtains and receives through the RX 160 the activated signal light state of the traffic signal light 90 transmitted by the TX 60 to the oncoming traffic, as well as can receive a time the received signal light state will be or remains to be activated. The RX processor 102 can then issue one or more state commands to the count-down timer 10 to count down, as well as can display on a suitable display of the count-down timer 10, such as a light emitting diode (LED) display, the received time, a preset time or an amount of time that a current signal light state of the traffic signal light 90 is to remain in effect, corresponding to the received signal light state, and can also issue one or more state commands to the one or more signaling units, such as the lights 20, 30 and 40, to selectively activate or inactivate one or more of the red light 20, the yellow light 30, and the green light 40 to mimic or correspond to the signal light state of the traffic light signal 90, based on the received signal light state of the traffic signal light 90.

The one or more signaling units, such as can include the count-down timer 10, the red light 20, the yellow light 30, and the green light 40 of the vehicle mounted traffic light 100 can face rearward relative to the vehicle V, such as in FIG. 5, in a manner that allows the signaling units of the vehicle mounted traffic light 100 to be seen by vehicles behind vehicle V. The vehicle mounted traffic light 100 can also face forward relative to the vehicle V, such as shown in FIGS. 4 and 6, as can display the signaling units of the vehicle mounted traffic light 100 in the image 100r in the rearview mirror M of the vehicle V, so as to be viewed by the driver of the vehicle V. Also, the vehicle mounted traffic light 100 can include, or as can be included in a separate second vehicle mounted traffic light 100, a second set of signaling units, such as a second set of lights 20, 30 and 40, as well as can include a second countdown timer 10, with one set of the count-down timer 10 and the lights 20, 30 and 40 facing in the forward direction relative to the vehicle V and a second set of the count-down timer 10 and the lights 20, 30 and 40 facing in the rearward direction relative to the vehicle V, to display the activated signal light state and the count down time in both the forward and rearward directions relative to the vehicle V, for example. The count-down timer 10, as can be various suitable timers, indicates an expected or an estimated amount of time that a current signal light state of the traffic signal 90 is to remain in effect. Also, the rear facing vehicle mounted traffic light 100 can give drivers behind vehicle V a "heads up" as to what the traffic signal light 90 is doing.

The RX processor 102 and the TX processor 202 can be associated with, or incorporated into, any suitable type of computing device, for example, a programmable logic controller (PLC) or an application specific integrated circuit (ASIC), for example. The RX processor 102, the RX 160, the countdown timer 10 and the lights 20, 30 and 40 of the vehicle mounted traffic light 100, and any associated computer readable media for the associated memory of the RX processor 102, can be in communication with one another by any suitable type of data bus, as is known in the art. Also, the TX processor 202, the TX 60, and the traffic signal light 90 of the vehicle mounted traffic light 100, and any associated computer readable media for the associated memory of the TX processor 202, can be in communication with one another by any suitable type of data bus, as is known in the art.

Examples of computer readable media for the associated memory include a magnetic recording apparatus, non-transitory computer readable storage memory, an optical disk, a magneto-optical disk, and/or a semiconductor memory (for example, RAM, ROM, etc.). Examples of magnetic recording apparatus that can also additionally be used for the associated memory include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

I claim:

1. A vehicle mounted traffic signal light for use with traffic control signal lights, consisting of:
   a traffic light signaling system including a plurality of traffic control signal lights, each traffic control signal light having an originating signal system unit associated therewith;
   each originating signal system unit having a processor for determining a state of the associated traffic control signal light of the traffic light signaling system, and a transmitter for transmitting the determined state of the associated traffic control signal light of the traffic light signaling system;
   a vehicle having a forward end and a rearward end, the vehicle including a rearview mirror located within the vehicle;
   wherein the origination signal system unit of each traffic control signal light is in relative proximity to the vehicle along a direction of travel;
   a receiver associated with the vehicle adapted for receiving the determined state from the transmitter of the traffic control signal light;
   wherein the receiver distinguishes the transmitted determined state of the associated traffic control signal light of the traffic control signaling system within a predetermined distance to the vehicle;
   a signal unit associated with the receiver for generating display signal of the determined state of the traffic control signal light;
   a display unit associated with the signal unit for selectively displaying the generated display signal, wherein the display signal corresponds to the state of the traffic control signal light;
   the display unit is sized and configured to be mounted within a rear portion of the interior of the vehicle, visible to a driver of the vehicle via the rear view mirror of the vehicle, and visible to at least each other driver of any vehicle behind the vehicle;
   the display unit including at least a red light, a yellow light, and a green light in a forward facing direction, and a red light, a yellow light, and a green light in a rearward facing direction;
   wherein the display unit has a reflected view in the rearview mirror and the reflected view is visible to the driver of the vehicle.

2. In combination, a vehicle and a vehicle mounted traffic light, comprising:
   the vehicle including a forward end and a rearward end, the vehicle including a rearview mirror located within the vehicle;
   a wireless receiver associated with the vehicle, the wireless receiver adapted to receive a signal light state of a traffic signal light from a wireless transmitter of an originating signal system unit associated with the traffic signal light;
   wherein the origination signal system unit is in close proximity to the vehicle along a direction of travel;
   at least one signaling unit being sized and configured to be disposed within the interior of the vehicle for selectively displaying the received signal light state and including a count-down timer indicating an amount of time that a current signal light state of the traffic signal light is to remain in effect;
   wherein each of the at least one signaling unit consists a plurality of lights corresponding to one or more of a red light state of the traffic signal light, a yellow light state of the traffic signal light and a green light state of the traffic signal light; and
   a receiver processor, the receiver processor being in operable communication with the wireless receiver and each of the at least one signaling unit;
   wherein each of the at least one signaling unit is mounted in the rear of the vehicle in a forward facing direction relative to the vehicle, and an image of the plurality of lights of the at least one signaling unit is visible in a rearview mirror of the vehicle;
   wherein the image of the plurality of lights of the signaling unit have a reflected view in the rearview mirror and the reflected view is visible to the driver of the vehicle;
   wherein the receiver processor sends one or more state commands to the at least one signaling unit to selectively activate and inactivate the at least one signaling unit to correspond to the received signal light state of the traffic signal light.

3. The combination according to claim 2, wherein the signal light state comprises an ON/OFF state of a corresponding one or more lights of the traffic signal light.

4. The combination according to claim 2, wherein the signal light state comprises an activated/inactivated state of a corresponding one or more lights of the traffic signal light.

5. The combination according to claim 4, wherein the signal light state of the traffic signal light is displayed by the at least one signaling unit so as to be visible to one or more other vehicles.

6. The combination according to claim 2, wherein each of the at least one signaling unit is mounted in the rear of the vehicle in at least one of a forward direction relative to the vehicle or a forward direction relative to the vehicle and a rearward direction relative to the vehicle.

7. A vehicle mounted traffic light system, comprising:
an originating signal system unit associated with a traffic signal light, the originating signal system unit including a processor to determine a signal light state of the traffic signal light and a wireless transmitter to direct transmission of the determined signal light state;
a vehicle having a forward end and a rearward end, the vehicle including a rearview mirror located within the vehicle toward the forward end;
wherein a vehicle driver looking forward at the rearview mirror is capable of viewing a reflection of the rearward end of the vehicle in the rearview mirror;
a wireless receiver associated with the vehicle, the wireless receiver adapted to receive from the wireless transmitter the determined signal light state of the traffic signal light;
a signaling unit associated with the rear of the vehicle to selectively display the received signal light state, the signaling unit consisting of a forward facing light set and a rearward facing light set;
the forward facing light set including a red light, a yellow light, and a green light;
the rearward facing light set including a red light, a yellow light, and a green light;
wherein each light set of the signaling unit is sized and configured to be mounted within the interior of the vehicle, the forward facing light set illuminating in a forward direction relative to the vehicle, and the rearward facing light set illuminating in a rearward direction relative to the vehicle; and
a receiver processor, the receiver processor being in operable communication with the wireless receiver and the signaling unit,
wherein the receiver processor sends one or more state commands to each of the signaling unit to selectively activate and inactivate the signaling unit to correspond to the received signal light state of the traffic signal light;
wherein the forward facing light set has a reflected view in the rearview mirror and the reflected view of the forward facing light set is visible to the driver of the vehicle.

8. The vehicle mounted traffic light system according to claim 7, wherein the signal light state comprises an ON/OFF state of a corresponding one or more lights of the traffic signal light.

9. The vehicle mounted traffic light system according to claim 7, wherein the signal light state comprises an activated/inactivated state of a corresponding one or more lights of the traffic signal light.

10. The vehicle mounted traffic light system according to claim 9, wherein the signal light state of the traffic signal light is displayed by each of the signaling unit so as to be visible to one or more other vehicles.

11. The vehicle mounted traffic light system according to claim 7, wherein each of the signaling unit is mounted in the rear of the vehicle;
wherein the forward facing light set illuminating in the forward direction relative to the vehicle, so as an image of the forward facing light set of the signaling unit is visible in the rearview mirror of the vehicle.

12. The vehicle mounted traffic light system according to claim 7, wherein forward facing light set and the rearward facing light set of the signaling unit comprises a plurality of lights corresponding to one or more of a red light state of the traffic signal light, a yellow light state of the traffic signal light and a green light state of the traffic signal light.

13. The vehicle mounted traffic light system according to claim 12, wherein the signaling unit further comprises a count-down timer indicating an amount of time that a current signal light state of the traffic signal light is to remain in effect.

14. The vehicle mounted traffic light system according to claim 12, wherein the forward facing light set of the signaling unit is mounted in the vehicle in a forward direction relative to the vehicle and the rearward facing light set of the signaling unit is mounted in a rearward direction relative to the vehicle.

* * * * *